(12) United States Patent
Moriyama et al.

(10) Patent No.: US 12,281,501 B2
(45) Date of Patent: Apr. 22, 2025

(54) VEHICLE DOOR

(71) Applicant: MAZDA MOTOR CORPORATION, Hiroshima (JP)

(72) Inventors: Yukihiro Moriyama, Hiroshima (JP); Eisuke Kuramoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 111 days.

(21) Appl. No.: 18/187,304

(22) Filed: Mar. 21, 2023

(65) Prior Publication Data
US 2023/0323708 A1 Oct. 12, 2023

(30) Foreign Application Priority Data
Apr. 8, 2022 (JP) ................................. 2022-064474

(51) Int. Cl.
*E05B 79/20* (2014.01)
*E05B 83/36* (2014.01)
*E05B 85/10* (2014.01)
*E05B 85/16* (2014.01)

(52) U.S. Cl.
CPC .............. *E05B 79/20* (2013.01); *E05B 83/36* (2013.01); *E05B 85/103* (2013.01); *E05B 85/16* (2013.01)

(58) Field of Classification Search
CPC ...... E05B 85/10; E05B 85/103; E05B 85/107; E05B 85/14; E05B 85/16; E05B 85/18
See application file for complete search history.

(56) References Cited

U.S. PATENT DOCUMENTS 8,746,758 B2 * 6/2014 Savant ................... E05B 85/16
292/336.3
10,145,155 B2 * 12/2018 Mathofer ............... E05B 85/16
(Continued)

FOREIGN PATENT DOCUMENTS

| CN | 108979368 A | 12/2018 | |
|---|---|---|---|
| CN | 109989640 A | * 7/2019 | ........... E05B 77/245 |
| CN | 209293603 U | * 8/2019 | ............ E05B 79/22 |

(Continued)

OTHER PUBLICATIONS

The extended European search report issued by the European Patent Office on Aug. 14, 2023, which corresponds to European Patent Application No. 23164224.0-1005 and is related to U.S. Appl. No. 18/187,304.

*Primary Examiner* — Alyson M Merlino
(74) *Attorney, Agent, or Firm* — Studebaker Brackett PLLC (57) ABSTRACT

A vehicle door maintains a pulling amount of a release cable without increasing the size of a cable pulling member, or degrading ease of operation of a door handle. The door includes a handle gripped by a user; a handle arm turned about a hinge pin with operation of the handle; a crank plate turned about a hinge pin with turning of the handle arm, thus pulling a release cable; and a latch device that releases a door lock when the release cable is pulled. The crank plate pulls the release cable by causing a contact surface, which comes into contact with the release cable, to move with turning of the crank plate. The contact surface is formed such that a distance from the hinge pin to the contact surface increases as the contact surface moves in a direction opposite to a turning direction when opening the door.

9 Claims, 10 Drawing Sheets

(56) References Cited

U.S. PATENT DOCUMENTS 11,686,133 B2 * 6/2023 Couto Maquieira . E05B 85/103
                                                        292/336.3
2020/0040616 A1 * 2/2020 Hu ......................... E05B 79/20

FOREIGN PATENT DOCUMENTS

| CN | 114251031 A | * | 3/2022 | |
|----|---|---|---|---|
| CN | 114737833 A | * | 7/2022 | |
| EP | 3032015 A1 | * | 6/2016 | ............. E05B 85/10 |
| EP | 3078793 B1 | * | 12/2019 | ........... E05B 13/002 |
| FR | 2914678 A1 | * | 10/2008 | ............. E05B 77/06 |
| JP | 2009-299369 A | | 12/2009 | |
| WO | WO-2004033832 A2 | * | 4/2004 | ............. E05B 79/20 |

* cited by examiner

TURNING DIRECTION
IN OPENING DOOR
(DIRECTION IN WHICH
CABLE IS PULLED)

VEHICLE DOOR

TECHNICAL FIELD

The present disclosure relates to a vehicle door in which a lock is released by pulling a release cable in response to the operation of a handle by a user.

BACKGROUND

There is a conventionally known technique in which, when a handle that is provided to a vehicle door is operated by a user, a release cable that is provided on the inner side of the outer panel of the door is pulled, thus releasing the lock of the door. For example, Japanese Patent Laid-Open No. 2009-299369 discloses a system in which a door is switched to a lock release state by causing a latch mechanism to be activated via a transmission cable in response to the operation of an outside handle.

SUMMARY

In the above-mentioned vehicle door, in pulling the release cable in response to the operation of the handle by the user, a predetermined component (cable pulling member) is provided on the inner side of the outer panel. This cable pulling member achieves the pulling of the release cable by being activated (turned, for example) with the operation of the handle by the user.

In a device in which the lock of a vehicle door is released, that is, a door latch is released, by pulling a release cable, it is desirable to ensure a sufficient pulling amount of the release cable in order to achieve an appropriate activation to release the door latch. As one method of ensuring the pulling amount of the release cable, it is possible to increase the size of the above-mentioned cable pulling member provided on the inner side of the outer panel. When the size of the cable pulling member is increased, the amount of activation of the cable pulling member is increased, thus also increasing the pulling amount of the release cable. However, in this method, the cable pulling member of a large size is provided on the inside of the door, and hence the member is likely to come into contact with other members (typically door glass) in the door due to vibration during vehicle travel.

An alternative method can also be used in which, to ensure the pulling amount of a release cable, a vehicle door is formed in such a way as to increase the operation amount of the handle operated by the user. However, in this method, there is a possibility that ease of operation of the handle for the user decreases. For example, when the handle is configured to be moved to an angle or a position at which the user cannot easily operate the handle, the handle is likely to slip out of the hand of the user while being operated.

The present disclosure has been made to solve the above-described problems by ensuring, in a vehicle door in which a lock is released by pulling a release cable via a cable pulling member in response to the operation of a handle by the user, an appropriate pulling amount of the release cable while preventing an increase in size of the cable pulling member and a decrease in ease of operation of the handle.

To accomplish this, the present disclosure is directed to a vehicle door including: a handle that is gripped by a user to perform an operation of opening the vehicle door; a handle arm that is turned about a rotary shaft with an operation of the handle by the user, the rotary shaft being located inward of an outer panel of the vehicle door in a vehicle width direction; a cable pulling member that is configured to be turned about a rotary shaft with turning of the handle arm, thus pulling a release cable, the rotary shaft being located inward of the outer panel in the vehicle width direction; and a latch device that is connected to the release cable and is configured to release a lock of the vehicle door when the release cable is pulled, wherein the cable pulling member has a contact surface that comes into contact with the release cable, and is configured to pull the release cable by causing the contact surface to move with turning of the cable pulling member, and the contact surface of the cable pulling member is formed such that a distance from the rotary shaft of the cable pulling member to the contact surface increases as the contact surface moves in a direction opposite to a turning direction when performing the operation of opening the vehicle door.

According to an embodiment having such a configuration, the vehicle door includes the cable pulling member that is turned with the turning of the handle arm occurring in response to the operation of the handle by the user, thus being activated to pull the release cable, this cable pulling member has the contact surface that come into contact with the release cable, and is configured to pull the release cable by causing the contact surface to move with the turning of the cable pulling member. Particularly, the contact surface of the cable pulling member according to the present embodiment is formed such that the distance from the rotary shaft of the cable pulling member to the contact surface increases as the contact surface goes in the direction opposite to the turning direction in opening the door.

In such a vehicle door, as the opening operation progresses, that is, as the turning of the cable pulling member progresses, a portion of the release cable on the side in the direction opposite to the turning direction starts to newly come into contact with the contact surface of the cable pulling member, so that the release cable is pulled (in other words, is drawn) with the turning of the cable pulling member.

In the case in which the contact surface of the cable pulling member is formed such that the distance from the rotary shaft increases as the contact surface goes in the direction opposite to the turning direction as described above, when the turning of the cable pulling member progresses, the radius of rotation gradually increases at a portion of the contact surface that starts to newly come into contact with the release cable, that is, the end portion (this portion significantly contributing to the pulling of the release cable) in the direction opposite to the turning direction in the portion of the contact surface that comes into contact with the release cable, so that the amount of movement in the circumferential direction increases at such a portion. As a result, as the operation of opening the door progresses, the pulling amount of the release cable pulled by the cable pulling member gradually increases. Accordingly, according to the present disclosure, it is possible to ensure an appropriate pulling amount of the release cable without increasing the size of the cable pulling member or increasing the operation amount of the handle.

In the present embodiment, it is preferable that the contact surface of the cable pulling member be formed into a curved shape that bulges more inward in the vehicle width direction toward the rotary shaft of the cable pulling member as the contact surface goes in the turning direction in performing the operation of opening the vehicle door. The present embodiment having such a configuration, in other words, the contour line of the contact surface of the cable pulling member in cross section does not curve in a direction in which the contour line is away from the rotary shaft as going in the turning direction in opening the door. Accordingly, it is possible to prevent bending of the release cable when the release cable is pulled by the contact surface of the cable pulling member.

In the present embodiment, it is preferable that the contact surface of the cable pulling member be formed into an elliptical shape in which the distance from the rotary shaft of the cable pulling member to the contact surface gradually increases as the contact surface goes in the direction opposite to the turning direction in performing the operation of opening the vehicle door. In the present embodiment having such a configuration, the contact surface of the cable pulling member has an elliptical shape in which a curvature decreases as the contact surface goes in the direction opposite to the turning direction in opening the door. With such a configuration, it is possible to accurately ensure a sufficient pulling amount of the release cable while preventing bending of the release cable when the release cable is pulled by the cable pulling member.

In the present embodiment, it is preferable that the handle be provided to be capable of assuming a state in which the handle is housed in the outer panel or a state in which the handle protrudes outward from the outer panel, thus allowing the user to grip the handle. In the present embodiment having such a configuration, the handle is configured to be capable of assuming a housed position, in which the handle is housed in the outer panel, or a gripping position, in which the handle protrudes outward from the outer panel. In such a configuration, although the handle is turned from the housed position to the gripping position, after such an operation, to perform an operation of opening the door, the handle is further turned from the gripping position, in which the handle is already turned to some extent. For this reason, there is a tendency for the handle to have a large angle after the handle is turned to release the lock of the door. However, from a viewpoint of ease of operation of the handle, it is safe to say that it is undesirable to bring the handle into a state in which the handle is turned to a large angle as described above. In contrast, in the vehicle door according to the present disclosure, a sufficient pulling amount of the release cable is ensured by forming the cable pulling member as described above and hence, it is not necessary to turn the handle to a large angle in order to release the lock of the door. Accordingly, according to the present disclosure, even when the handle is configured to assume the housed position or the gripping position, it is possible to prevent a decrease in ease of operation of the handle in appropriately releasing the lock of the door.

In the present embodiment, it is preferable that the rotary shaft of the handle arm and the rotary shaft of the cable pulling member be formed of an identical shaft. According to the present embodiment having such a configuration, it is possible to reduce the size of the device or to simplify the configuration compared with the case in which the rotary shaft of the handle arm and the rotary shaft of the cable pulling member are formed of different shafts.

In the present embodiment, in a preferable embodiment, it is preferable that the latch device be configured to electrically release the lock of the vehicle door when the release cable is pulled.

According to the present embodiment, it is possible to ensure, in the vehicle door in which the lock is released by pulling the release cable via the cable pulling member in response to the operation of the handle by the user, an appropriate pulling amount of the release cable while preventing an increase in size of the cable pulling member and a decrease in ease of operation of the handle.

DETAILED DESCRIPTION

Hereinafter, a vehicle door according to an embodiment of the present disclosure will be described with reference to attached drawings.

In the drawings described hereinafter, "F" denotes a forward direction of a vehicle, "R" denotes a rearward direction of the vehicle, "UP" denotes an upward direction of the vehicle, and "OUT" denotes an outward direction in the vehicle width direction. Although the vehicle door according to the present disclosure is applicable to front doors or rear doors of a four door vehicle or to a lift gate or the like, in the embodiment described hereinafter, the description will be made for a structure in which the vehicle door according to the present disclosure is applied to the doors of a two door vehicle.

Figure 1:
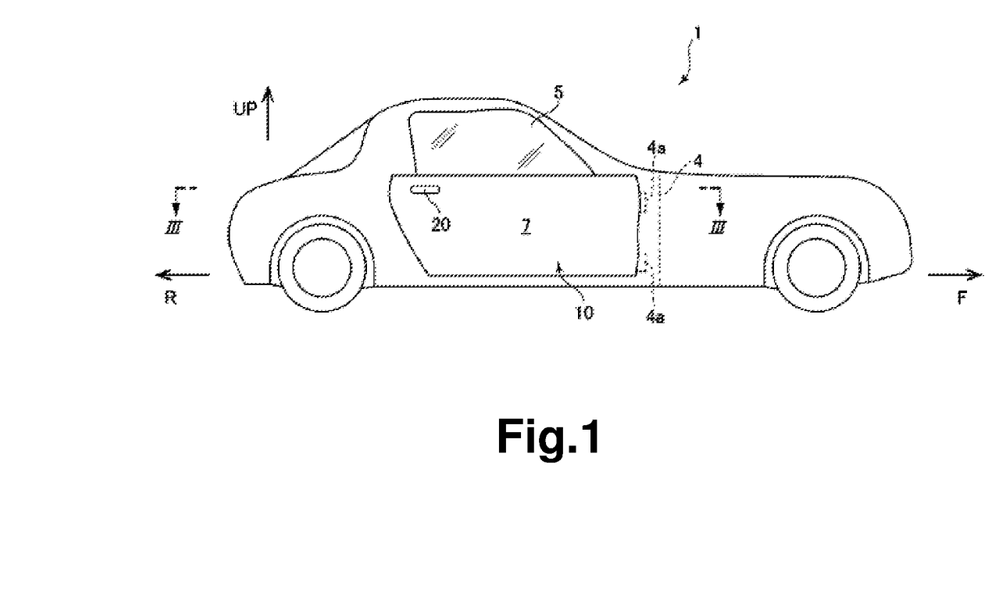
FIG. 1 is a side view of a vehicle to which a vehicle door according to an embodiment of the present disclosure is applied.

First, FIG. 1 is a side view of a vehicle to which the vehicle door according to this embodiment is applied. As shown in FIG. 1, in a vehicle 1, a vehicle door 10 serving as a side door is openably and closably attached to a hinge pillar 4 via a pair of upper and lower door hinges 4a, the hinge pillar 4 extending in the up-down direction at a front portion of a vehicle cabin. The vehicle door 10 includes, as main components, a door window glass 5 serving as a door window member, an outer panel 7 forming an outside panel, and an inner panel (not shown in the drawing) forming an inside panel. Further, the outer panel 7 is provided with a handle 20 that is gripped by the user to perform the operation of opening the vehicle door 10. Particularly, in this embodiment, the handle 20 is provided in such a way as to be capable of being housed in the outer panel 7.

Figure 2:
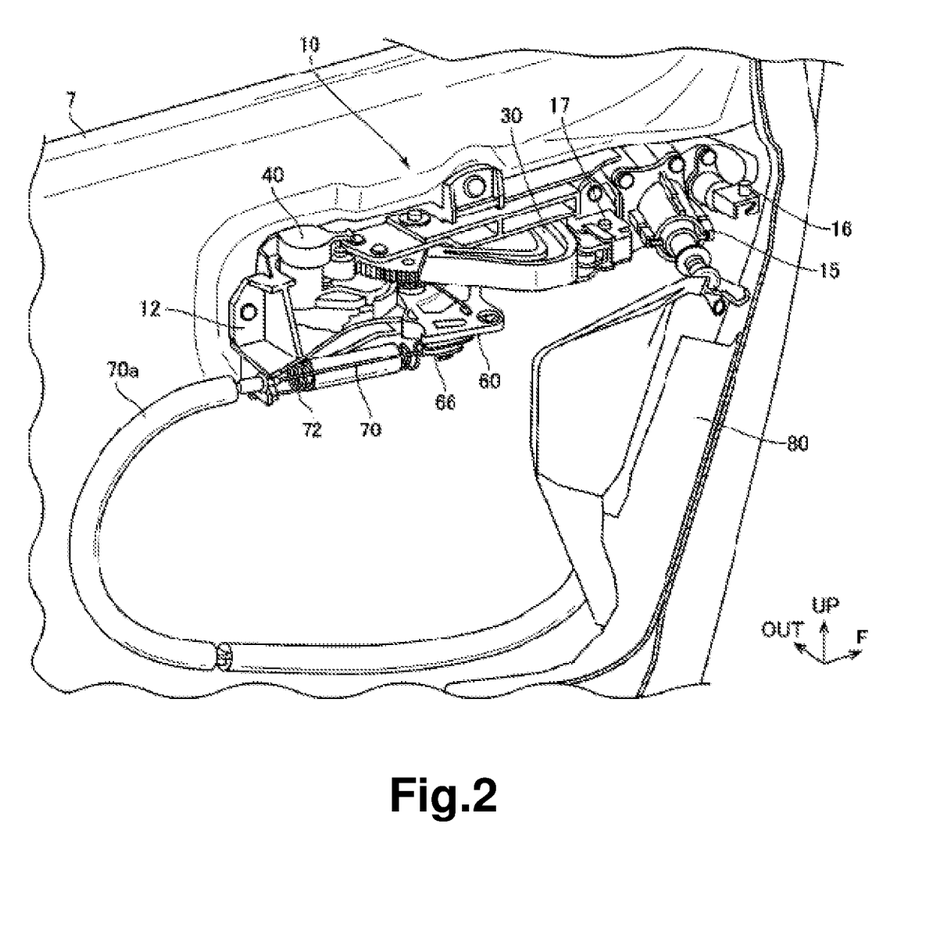
FIG. 2 is a perspective view of the vehicle door according to the embodiment of the present disclosure.

Next, FIG. 2 is a perspective view of the vehicle door 10 according to this embodiment. The summary of the respective constitutional elements of the vehicle door 10 will be described hereinafter.

As shown in FIG. 2, the vehicle door 10 includes, as main components, the handle 20 that is gripped by the user to perform the operation of opening the vehicle door 10 (not shown in FIG. 2, see FIG. 1), a handle arm 30 that is turned in the substantially horizontal direction about a rotary shaft with the operation of the handle 20 by the user, a crank plate 60 (cable pulling member) that is turned in the substantially horizontal direction about the rotary shaft with the turning of the handle arm 30, thus being activated to pull a release cable 70, and a latch device 80 that is connected to the release cable 70 and activated to release the lock of the vehicle door 10 (that is, to release a door latch) when the release cable 70 is pulled.

The vehicle door 10 also includes a key cylinder 15 into which a key for unlocking the vehicle door 10 is inserted, a switch 16 that is turned on when the handle 20 in a housed position is pushed from the outside, a driving device 40 that is energized when the switch 16 is turned on, thus being activated to cause the handle arm 30 to turn, causing the handle 20 in a housed position to protrude outward from the outer panel 7, specifically, causing the handle 20 to move to a gripping position that allows the user to grip the handle 20, a temporary holding mechanism 17 that temporarily holds the handle arm 30 at the gripping position when the handle arm 30 is moved to this gripping position, and a coil spring 72 that biases the crank plate 60 in the counter-release direction (meaning the direction opposite to the direction in which the crank plate 60 pulls the release cable 70. The same applies hereinafter.)

As shown in FIG. 2, in the vehicle door 10, the key cylinder 15, the switch 16, the temporary holding mechanism 17, the handle arm 30, the driving device 40, the crank plate 60 and the like are attached to the inner side of the outer panel 7 via a fixation member 12 extending in the vehicle front-rear direction. Particularly, these members are arranged side by side in the vehicle front-rear direction in the vicinity of the inner side of a portion at which the handle 20 is attached to the outer panel 7. In contrast, the latch device 80 is attached to the inner side of the outer panel 7 at a position close to the front side of the vehicle and lower than the fixation member 12. The release cable 70 has one end thereof connected to the crank plate 60 and the other end thereof connected to the latch device 80, and briefly extends toward the rear side of the vehicle from the crank plate 60 in such a way as to avoid the door window glass 5 (not shown in FIG. 2, see FIG. 1), and, thereafter, extends toward the front side of the vehicle, and is connected to the latch device 80. Further, the release cable 70 is partially covered by a cable cover 70a.

Figure 3:
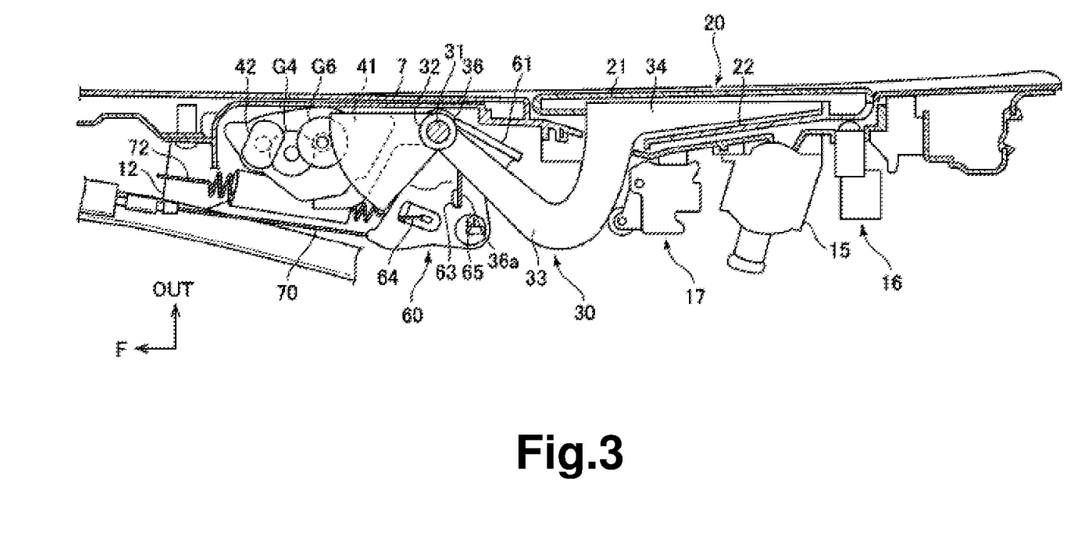
FIG. 3 is a cross-sectional view of the vehicle door according to the embodiment of the present disclosure with a handle in a housed position, as viewed along line in FIG. 1.
Figure 4:
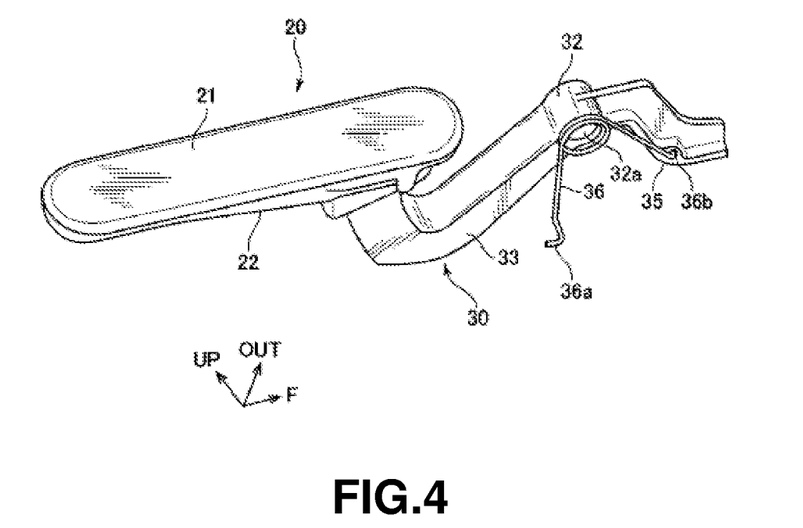
FIG. 4 is a perspective view of the handle and a handle arm according to the embodiment of the present disclosure.
Figure 5A:
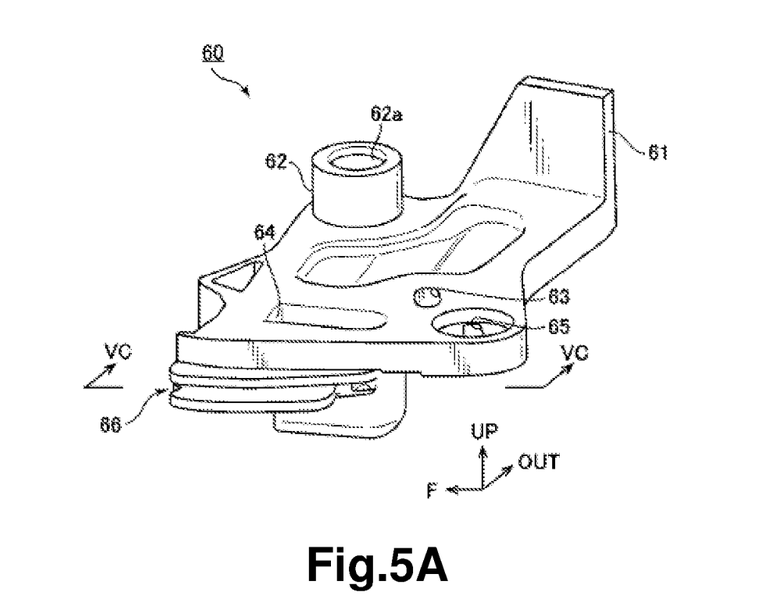
FIG. 5A is a perspective view of a crank plate according to the embodiment of the present disclosure.
Figure 5B:
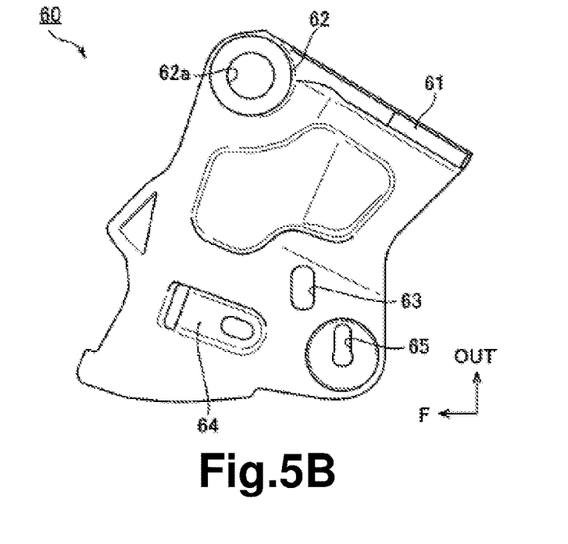
FIG. 5B is a top plan view of the crank plate according to the embodiment of the present disclosure.
Figure 5C:
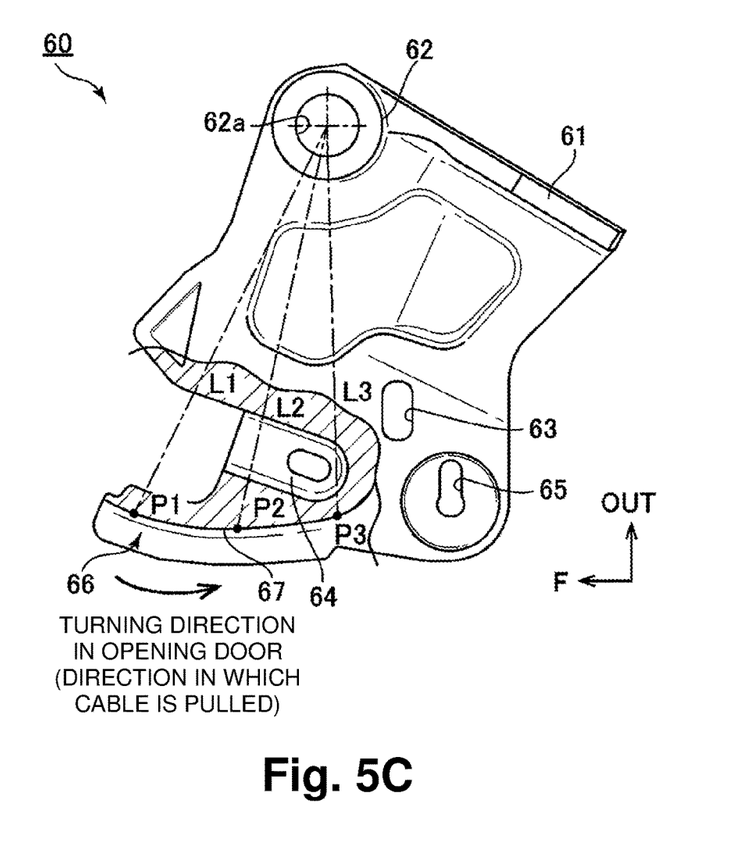
FIG. 5C is a partial cross-sectional view of the crank plate according to the embodiment of the present disclosure, as viewed along line VC-VC in FIG. 5(A).
Figure 6A:
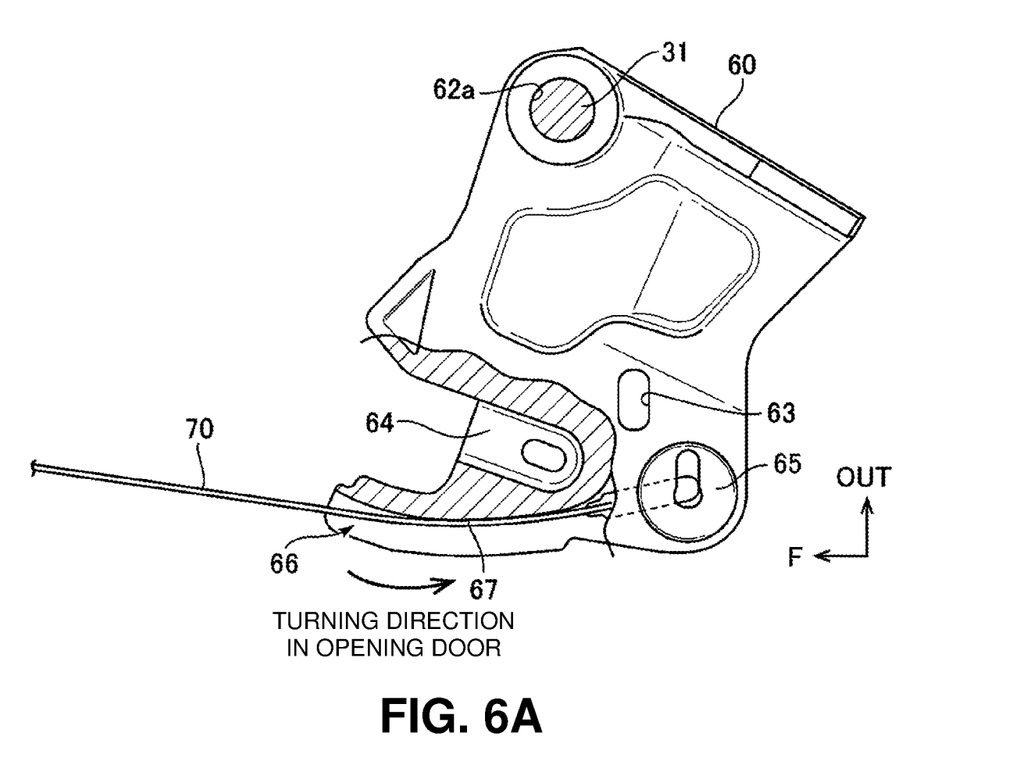
FIG. 6A is a partial cross-sectional view of the crank plate according to the embodiment of the present disclosure in a position before the crank plate is turned, as viewed along line VC-VC in FIG. 5(A).
Figure 6B:
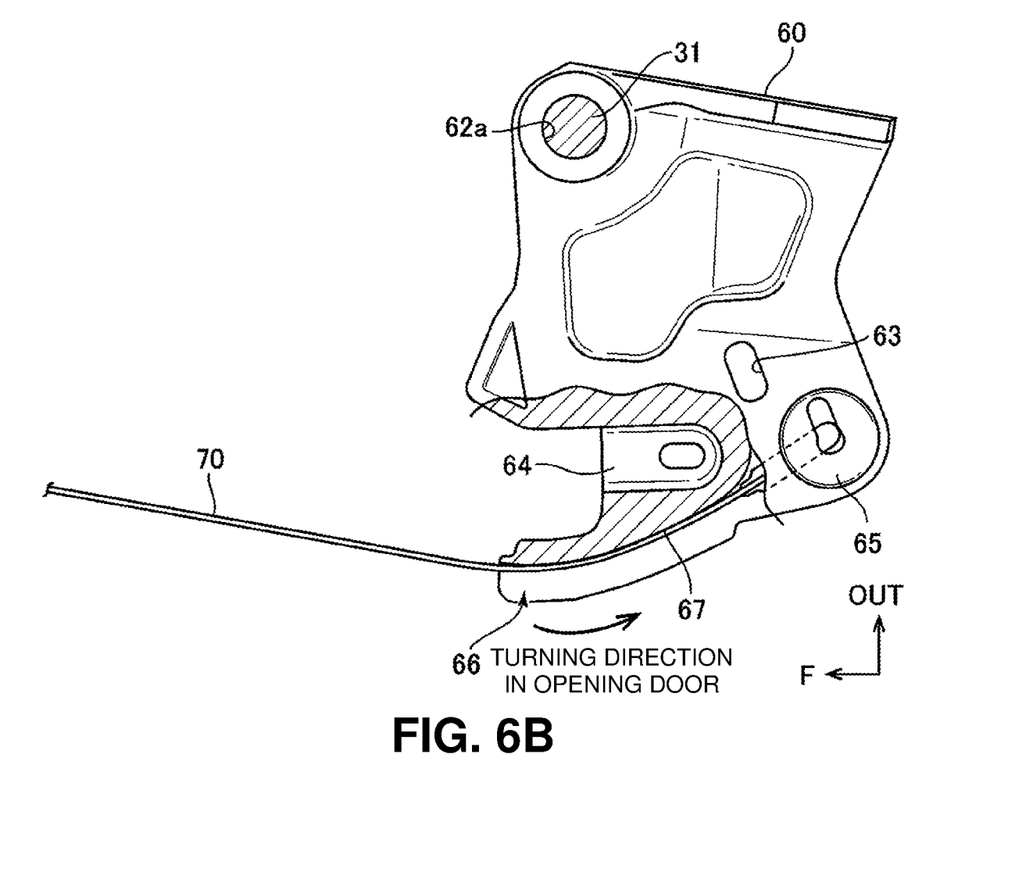
FIG. 6B is a partial cross-sectional view of the crank plate according to the embodiment of the present disclosure in a position after the crank plate is turned, as viewed along line VC-VC in FIG. 5(A).
Figure 7:
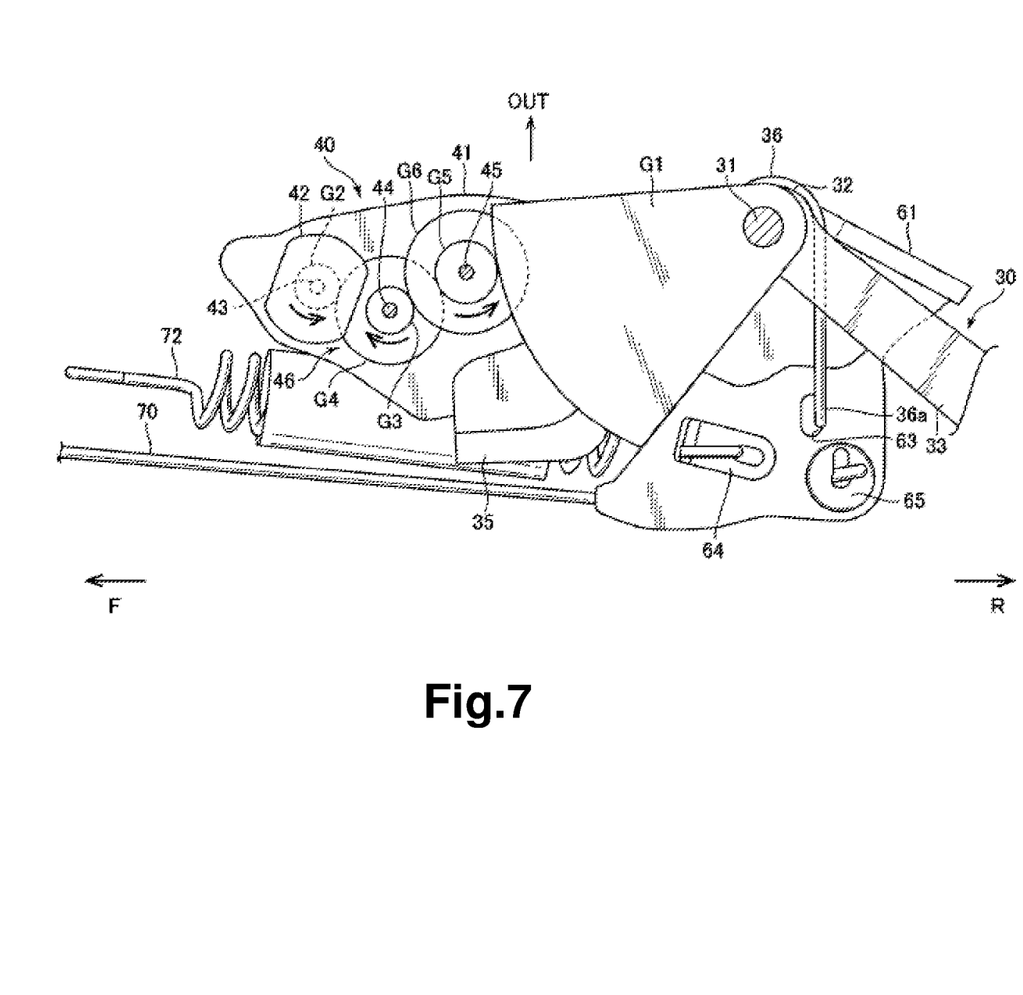
FIG. 7 is a top plan view of a driving device and the like according to the embodiment of the present disclosure.
Figure 8:
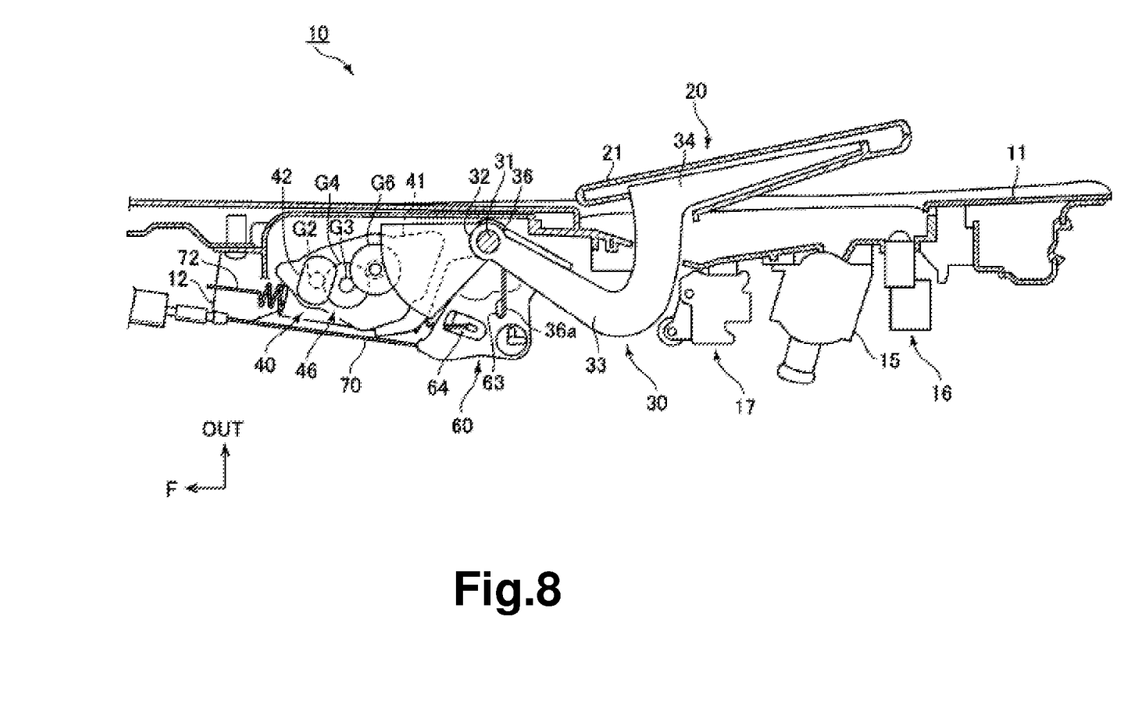
FIG. 8 is a cross-sectional view of the vehicle door according to the embodiment of the present disclosure with the handle in a gripping position, as viewed along line in FIG. 1.
Figure 9:
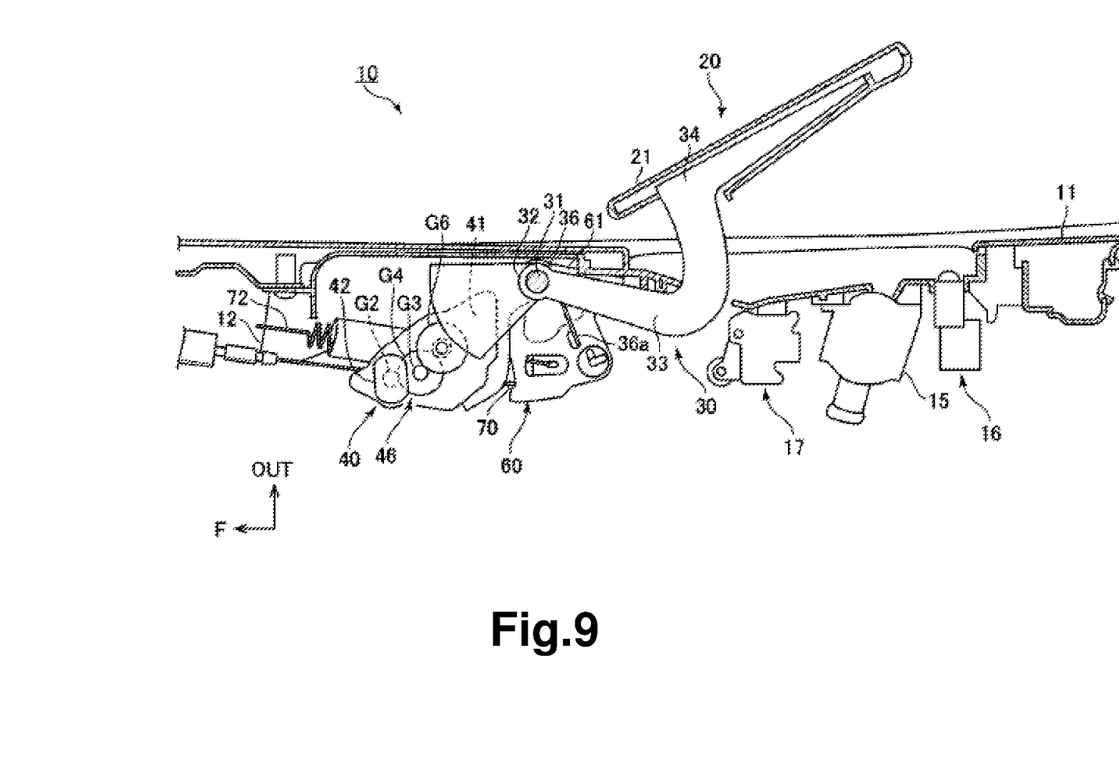
FIG. 9 is a cross-sectional view of the vehicle door according to the embodiment of the present disclosure with the handle in an open position, as viewed along line in FIG. 1.

Next, the specific configuration of the vehicle door 10 will be described in detail with reference to FIG. 3 to FIG. 9. FIG. 3 shows a cross-sectional view of the vehicle door 10 with the handle 20 in a housed position, as viewed along line in FIG. 1. FIG. 4 shows a perspective view of the handle 20 and the handle arm 30. FIG. 5(A) shows a perspective view of the crank plate 60, FIG. 5(B) shows a top plan view of the crank plate 60, and FIG. 5(C) shows a partial cross-sectional view of the crank plate 60, as viewed along line VC-VC in FIG. 5(A), particularly, shows a cross-sectional view of an area in the vicinity of a contact surface 67. FIG. 6(A) is a partial cross-sectional view of the crank plate 60 in a position before the crank plate 60 is turned, as viewed along line VC-VC in FIG. 5(A) in the same manner as FIG. 5(C), particularly, is a partial cross-sectional view showing a contact state between the contact surface 67 and the release cable 70, FIG. 6(B) is a partial cross-sectional view of the crank plate 60 in a position after the crank plate 60 is turned, as viewed along line VC-VC in FIG. 5(A) in the same manner as FIG. 5(C), particularly, is a partial cross-sectional view showing a contact state between the contact surface 67 and the release cable 70. FIG. 7 is a top plan view of the driving device 40 and the like. FIG. 8 shows a cross-sectional view of the vehicle door 10 with the handle 20 in a gripping position, as viewed along line in FIG. 1 in the same manner as FIG. 3. FIG. 9 is a cross-sectional view of the vehicle door 10 with the handle 20 in an open position, as viewed along line in FIG. 1 in the same manner as FIG. 3.

As shown in FIG. 3, the vehicle door 10 includes, as described above, the handle 20 that is capable of protruding and retracting from the opening of the outer panel 7 serving as a door panel, the handle arm 30 having a swan-neck structure to which the handle 20 is attached and that is turned with the operation of the handle 20, the driving device 40 that transmits power to the handle arm 30 in such a way as to cause the handle 20 to protrude from the outer panel 7, that is, to cause the handle 20 to move to a gripping position, the crank plate 60 (cable pulling member) that, when the handle 20 is operated from the gripping position, is turned with the turning of the handle arm 30, thus pulling the release cable 70, and the like. As shown in FIG. 3, FIG. 4, the handle 20 is obtained by concave-convex fitting and by joining and fixing the peripheral edge portions of an outer cover 21 and an inner cover 22, and is formed into an elongated circular shape elongating in the vehicle front-rear direction as viewed from the side.

As shown in FIG. 3, the handle arm 30 has one end (rear end in this example) to which the handle 20 is attached, and a hinge pin 31 penetrates through the handle arm 30, the hinge pin 31 serving as the rotary shaft that causes the handle 20 to rotate in such a way as to protrude from the outer panel 7. Further, as shown in FIG. 3 and FIG. 4, the handle arm 30 includes, as an integral body, a shaft support portion 32 that pivotally supports the hinge pin 31 because of penetration of the hinge pin 31 through a through hole 32a, a handle support portion 34 that extends in the rearward direction from the shaft support portion 32 via a neck portion 33 having a swan-neck shape, and an extending portion 35 that extends from the shaft support portion 32 in the forward direction, that is, in the direction opposite to the neck portion 33. The handle arm 30 is turned in the substantially horizontal direction about the hinge pin 31, serving as the rotary shaft, with the operation of the handle 20 by the user.

As shown in FIG. 3, the handle support portion 34 of the handle arm 30 is disposed in the handle 20 formed of the outer cover 21 and the inner cover 22. Further, a motor base 41 is attached to the extending portion 35 of the handle arm 30, a motor 42 being fixed to the motor base 41 in the driving device 40. With such a configuration, the handle arm 30 is moved with the movement of the motor base 41 caused by driving of the motor 42.

Next, the crank plate 60 will be described with reference to FIG. 3 and FIGS. 5A to 5C. As shown in FIG. 3, the plate-like crank plate 60 is turnably provided coaxially with the above-mentioned hinge pin 31, the crank plate 60 extending in the substantially horizontal direction. Specifically, as shown in FIG. 5A, FIG. 5B, the crank plate 60 includes a plate-like vertical wall 61 that is provided at the edge end portion at a position close to the outer side in the vehicle width direction and extends in the upward direction, and a shaft support portion 62 that has a through hole 62*a* and pivotally supports the hinge pin 31 penetrating through the through hole 62*a*.

The crank plate 60 is turned in the substantially horizontal direction about the hinge pin 31, serving as the rotary shaft, with the above-described turning of the handle arm 30 occurring in response to the operation of the handle 20 by the user. More specifically, when the handle 20 and the handle arm 30 are turned to a gripping position (see FIG. 8), the neck portion 33 of the handle arm 30 is brought into contact with the vertical wall 61 of the crank plate 60 (until this point in time, the crank plate 60 does not start to be turned). Thereafter, when the handle 20 and the handle arm 30 are further turned, the vertical wall 61 is pushed by the neck portion 33 of the handle arm 30, thus causing the crank plate 60 to turn (see FIG. 9).

Further, as shown in FIG. 5A, FIG. 5B, the crank plate 60 has three openings 63, 64, 65 extending in the up-down direction. First, as shown in FIG. 3, one end 36*a* of a torsion spring 36 is engaged with the opening 63 of the crank plate 60. The torsion spring 36 is wound around the hinge pin 31 (see FIG. 3), and the other end 36*b* is engaged with the extending portion 35 of the handle arm 30 (see FIG. 4). With such a torsion spring 36, the handle 20 is always biased in the housing direction via the handle arm 30. To be more specific, the torsion spring 36 functions to cause the neck portion 33 of the handle arm 30 to be spaced apart from the vertical wall 61 of the crank plate 60 when the handle 20 is in a housed position (see FIG. 3).

Next, as shown in FIG. 3, one end of the coil spring 72 is engaged with the opening 64 of the crank plate 60. The other end of the coil spring 72 is engaged with the fixation member 12. With such a coil spring 72, the crank plate 60 is always biased in the counter-release direction. Note that the spring force of the coil spring 72 is set to be larger than the spring force of the above-mentioned torsion spring 36.

Next, as shown in FIG. 3, one end of the release cable 70 is engaged with the opening 65 of the crank plate 60. As shown in FIG. 2 and FIG. 5A, a portion of the release cable 70 located on the proximal end side of the one end, which is engaged with the opening 65, is accommodated in a slit portion 66 that is provided to the side wall of the crank plate 60 on the vehicle-width-direction inner side and that is recessed outward in the vehicle width direction. More specifically, as shown in FIG. 5C, in the slit portion 66 of the crank plate 60, the inner wall located on the vehicle-width-direction outer side is formed by a surface (contact surface) 67 having a curved shape, and the portion of the release cable 70 comes into contact with the crank plate 60 on this contact surface 67 of the slit portion 66. As described above, when the crank plate 60 is turned with the turning of the handle arm 30 occurring in response to the operation of the handle 20 by the user, the contact surface 67 of the slit portion 66 is moved, so that the release cable 70 that is in contact with this contact surface 67 is moved to follow the contact surface 67, thus being pulled in a turning direction of the crank plate 60 (FIGS. 6A, 6B).

Further, as shown in FIG. 5C, the contour line of the contact surface 67 of the crank plate 60 in cross section taken along the turning direction (substantially horizontal direction) of the crank plate 60 is formed such that a distance from the hinge pin 31 (uniquely the through hole 62*a*), serving as the rotary shaft, increases as the contour line goes in the direction opposite to the turning direction in opening the door. As shown in FIG. 5C, when taking, as an example, three points P1, P2, P3 on the contour line of the contact surface 67 in cross section, three points P1, P2, P3 being determined in order from the side in the direction opposite to the turning direction in opening the door, distances L1, L2, L3 from these three points P1, P2, P3 to the center of the through hole 62*a* have a relationship of "L1>L2>L3". Further, the contour line of the contact surface 67 has a curved shape that bulges more inward in the vehicle width direction toward the through hole 62*a* as the contour line goes in the turning direction in opening the door (in other words, a curved shape that protrudes as viewed from the through hole 62*a*). That is, the contour line of the contact surface 67 does not curve in a direction in which the contour line is away from the through hole 62*a* as going in the turning direction in opening the door. To be more specific, the curved shape of such a contact surface 67 is an elliptical shape in which a distance from the through hole 62*a* gradually increases as the contour line goes in the direction opposite to the turning direction in opening the door, that is, an elliptical shape in which a curvature decreases as the contour line goes in the direction opposite to the turning direction in opening the door.

The contact state between the contact surface 67 of the crank plate 60 and the release cable 70 will be specifically described with reference to FIG. 6A and FIG. 6B. FIG. 6A is a partial cross-sectional view showing the contact state between the contact surface 67 of the crank plate 60 and the release cable 70 with the crank plate 60 in a position before the crank plate 60 is turned, that is, with the handle 20 in a housed position (FIG. 3) or a gripping position (FIG. 8). FIG. 6B is a partial cross-sectional view showing the contact state between the contact surface 67 of the crank plate 60 and the release cable 70 with the crank plate 60 in a position after the crank plate 60 is turned to open the door, that is, with the handle 20 in an open position (FIG. 9).

As can be clearly understood by comparing FIG. 6A and FIG. 6B, when the crank plate 60 is turned, the contact surface 67 is also moved (rotated), so that a portion of the release cable 70 on the side in the direction opposite to the turning direction gradually starts to come into contact with the contact surface 67, that is, a portion of the release cable 70 that comes into contact with the contact surface 67 gradually increases. As a result, the release cable 70 is pulled in this turning direction (in other words, is drawn toward the rear side of the vehicle) with the turning of the crank plate 60.

Next, the description will be made, with reference to FIG. 7, for the configuration of the driving device 40 that is attached to the extending portion 35 of the handle arm 30 as described above and that transmits power to the handle arm 30. As shown in FIG. 7, the driving device 40 includes a fan-shaped sector gear G1 fixed coaxially with the hinge pin 31, and the sector gear G1 is fitted on the hinge pin 31 and is fixed to the above-mentioned fixation member 12 (that is, the position being unchangeable). Further, as shown in FIG. 7, the motor 42 is attached to the motor base 41, an output gear G2 is fitted on a rotary shaft 43 of the motor 42, and an idle gear G4 provided with a pinion gear G3 is provided to a shaft 44 provided to the motor base 41. In addition to the above, a driven gear G6 provided with a pinion gear G5 is provided to another shaft 45 provided to the motor base 41.

The output gear G2 meshes with the idle gear G4, the pinion gear G3 meshes with the driven gear G6, and the pinion gear G5 meshes with the sector gear G1. With such a configuration, when the rotary shaft 43 of the motor 42 and the output gear G2 are rotated in the counterclockwise direction in FIG. 7 by driving the motor 42, the pinion gear G5 rotates in the counterclockwise direction in FIG. 7 via the respective gears G2, G4, G3, G6 in this order. When the pinion gear G5 rotates in the counterclockwise direction in FIG. 7, as the position of the sector gear G1 is unchangeable, a gear train 46, including the respective elements G2 to G6, the motor 42, and the motor base 41 move, along the fan shape of the sector gear G1, in the direction that causes the handle 20 to protrude, thus causing the handle 20 to protrude via the handle arm 30.

Next, respective states of the vehicle door 10, specifically, states of the handle 20 in respective positions, will be described with reference to FIG. 3, FIG. 8, FIG. 9. The handle 20 is configured to be capable of turning between the housed position in which the outer cover 21 of the handle 20 is flush with the outer panel 7 (see FIG. 3), the gripping position in which the entire design surface of the handle 20 is caused to protrude from the outer panel 7 by the driving device 40, thus allowing the user to grip the handle 20, the entire design surface of the handle 20 being flush when the handle 20 is in the housed position (see FIG. 8), and the open position in which the handle 20 further protrudes relative to the handle 20 in the gripping position (see FIG. 9).

Within the range from the housed position shown in FIG. 3 to the gripping position shown in FIG. 8, the handle 20 is turned by the driving device 40. As described above, when the handle 20 in the housed position is pushed from the outside, the switch 16 is turned on. At this point of operation, the motor 42 of the driving device 40 is energized and is activated to cause the handle arm 30 to turn, so that due to the turning of the handle arm 30, the handle 20 in the housed position is caused to protrude toward the gripping position in which the handle 20 protrudes outward from the outer panel 7. Until the handle arm 30 reaches the gripping position shown in FIG. 8 from the housed position shown in FIG. 3, the crank plate 60 is biased in the counter-release direction by the coil spring 72 having a strong spring force, thus not moving.

In the gripping position shown in FIG. 8, the handle 20 protrudes outward from the outer panel 7, thus allowing the user to grip the handle 20. The handle 20 is turned by the user from this gripping position to the open position shown in FIG. 9. Specifically, first, when the handle 20 reaches the gripping position, the neck portion 33 of the handle arm 30 is brought into contact with the vertical wall 61 of the crank plate 60 (see FIG. 8). Thereafter, when the handle 20 is operated by the user to turn in the opening direction against the spring force of the coil spring 72, the crank plate 60 is pushed by the handle arm 30 via the vertical wall 61, thus being turned in the release direction (see FIG. 9). With such an operation, the release cable 70 is pulled due to the turning of the crank plate 60, so that the latch device 80 (see FIG. 2) is activated to release the door latch. For example, the latch device 80 is configured such that, when a sensor detects that the release cable 70 is pulled, an actuator is driven to electrically release the door latch.

Next, the manner of operation and advantageous effect of the vehicle door 10 according to this embodiment will be described.

The vehicle door 10 according to this embodiment includes the crank plate 60 (cable pulling member) that is turned with the turning of the handle arm 30 occurring in response to the operation of the handle 20 by the user, thus being activated to pull the release cable 70, the crank plate 60 has the contact surface 67 that comes into contact with the release cable 70, and is configured to pull the release cable 70 by causing the contact surface 67 to move with the turning of the crank plate 60. Particularly, in this embodiment, the crank plate 60 is formed such that the distance from the rotary shaft (the hinge pin 31) of the crank plate 60 to the contact surface 67 increases as the contour line of the contact surface 67 in cross section taken along the turning direction goes in the direction opposite to the turning direction in opening the door (see FIG. 5C).

As described above, as the operation of opening the door progresses, that is, as the turning of the crank plate 60 progresses, a portion of the release cable 70 on the side in the direction opposite to the turning direction starts to gradually come into contact with the contact surface 67, that is, the portion of the release cable 70 that comes into contact with the contact surface 67 gradually increases (see FIG. 6A, FIG. 6B). In such a case, in the case in which the contact surface 67 of the crank plate 60 is formed such that the distance from the rotary shaft (the hinge pin 31) increases as the contact surface 67 goes in the direction opposite to the turning direction as described above (see FIG. 5C), when the turning of the crank plate 60 progresses, the radius of rotation gradually increases at a portion of the contact surface 67 that starts to newly come into contact with the release cable 70, that is, the end portion (this portion significantly contributing to the pulling of the release cable 70) in the direction opposite to the turning direction in the portion of the contact surface 67 that comes into contact with the release cable 70, so that the amount of movement in the circumferential direction increases at the end portion. As a result, as the operation of opening the door progresses, the pulling amount of the release cable 70 pulled by the crank plate 60 gradually increases. Accordingly, according to this embodiment, it is possible to ensure an appropriate pulling amount of the release cable 70 without increasing the size of the crank plate 60 or increasing the operation amount of the handle 20.

Further, according to this embodiment, the contact surface 67 of the crank plate 60 has a curved shape (elliptical shape, for example) that bulges more inward in the vehicle width direction toward the rotary shaft (the hinge pin 31) as the contact surface 67 goes in the turning direction in opening the door. In other words, the contour line of the contact surface 67 does not curve in the direction in which the contour line is away from the rotary shaft as going in the turning direction in opening the door. With such a configuration, it is possible to prevent bending of the release cable 70 when the release cable 70 is pulled by the contact surface 67 of the crank plate 60.

Further, according to this embodiment, the handle 20 is provided to be capable of assuming the state in which the handle 20 is housed in the outer panel 7 (housed position) or the state in which the handle 20 protrudes outward from the outer panel 7 to allow the user to grip the handle 20 (gripping position). In such a configuration, although the handle 20 is turned from the housed position to the gripping position, after such an operation, to perform an operation of opening the door, the handle 20 is further turned from the gripping position, in which the handle 20 is already turned to some extent. For this reason, there is a tendency for the handle 20 turned to release the lock of the door to have a large angle. However, from a viewpoint of ease of operation of the handle 20, it is safe to say that it is undesirable to turn the handle 20 to a large angle. In contrast, in the vehicle door 10 according to this embodiment, a sufficient pulling amount of the release cable 70 is ensured by forming the crank plate 60 as described above and hence, it is not necessary to turn the handle 20 to a large angle in order to release the lock of the door. Accordingly, according to this embodiment, even when the handle 20 is configured to assume the housed position or the gripping position, it is possible to prevent a decrease in ease of operation of the handle 20 in appropriately releasing the lock of the door.

Further, according to this embodiment, the rotary shaft of the handle arm 30 and the rotary shaft of the crank plate 60 are formed of an identical shaft (the hinge pin 31). With such a configuration, it is possible to reduce the size of the device or to simplify the configuration compared with the case in which different shafts are used.

Although the contour line of the contact surface 67 of the crank plate 60 is formed into an elliptical shape in the above-mentioned embodiment, this is not a limitation. In other embodiment, the contour line of the contact surface 67 may be formed into a circular shape (substantially true circle) instead of an elliptical shape. In this example, it is sufficient to shift the center point of a circular shape forming the contour line from the rotary shaft (the center point of the hinge pin 31) such that the distance from the hinge pin 31 increases as the contour line of the contact surface 67 goes in the direction opposite to the turning direction.

In the above-mentioned embodiment, the handle 20 is electrically moved from the housed position to the gripping position by the driving device 40 (the motor 42). However, in other embodiment, the handle 20 may be manually moved from the housed position to the gripping position. In this example, it is sufficient to form the handle 20 and the like such that the handle 20 in a housed position can be manually pulled by the user.

What is claimed is:

1. A vehicle door comprising:
   a handle gripped by a user to perform an operation of opening the vehicle door;
   a handle arm that turns about a rotary shaft with an operation of the handle by the user to perform the operation of opening the vehicle door, the rotary shaft being located inward of an outer panel of the vehicle door in a vehicle width direction;
   a cable pulling member configured to be turned about the rotary shaft with turning of the handle arm, thus pulling a release cable; and
   a latch device connected to the release cable and configured to unlock the vehicle door when the release cable is pulled, wherein
   the cable pulling member has a contact surface that comes into contact with the release cable, and is configured to pull the release cable by causing the contact surface to move with turning of the cable pulling member during the operation of the handle by the user to perform the operation of opening the vehicle door, and
   the contact surface of the cable pulling member is configured such that a distance from the rotary shaft to the contact surface increases as the contact surface moves in a direction opposite a turning direction in performing the operation of opening the vehicle door.

2. The vehicle door according to claim 1, wherein the contact surface of the cable pulling member is a curved shape that bulges inward in the vehicle width direction as the contact surface moves in the turning direction in performing the operation of opening the vehicle door.

3. The vehicle door according to claim 2, wherein the handle is movable between a state in which the handle is housed in the outer panel and a state in which the handle protrudes outward from the outer panel thus allowing the user to grip the handle.

4. The vehicle door according to claim 2, wherein the latch device is configured to electrically unlock the vehicle door when the release cable is pulled.

5. The vehicle door according to claim 2, wherein the contact surface of the cable pulling member is a partial generally elliptical shape in which the distance from the rotary shaft to the contact surface increases as the contact surface moves in the direction opposite the turning direction in performing the operation of opening the vehicle door.

6. The vehicle door according to claim 5, wherein the handle is movable between a state in which the handle is housed in the outer panel and a state in which the handle protrudes outward from the outer panel thus allowing the user to grip the handle.

7. The vehicle door according to claim 5, wherein the latch device is configured to electrically unlock the vehicle door when the release cable is pulled.

8. The vehicle door according to claim 1, wherein the handle is movable between a state in which the handle is housed in the outer panel and a state in which the handle protrudes outward from the outer panel thus allowing the user to grip the handle.

9. The vehicle door according to claim 1, wherein the latch device is configured to electrically unlock the vehicle door when the release cable is pulled.

* * * * *